United States Patent
Zagni (10) Patent No.: US 8,813,200 B2
(45) Date of Patent: Aug. 19, 2014

(54) ONLINE PASSWORD MANAGEMENT

(75) Inventor: Renzo Zagni, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1288 days.

(21) Appl. No.: 11/963,405

(22) Filed: Dec. 21, 2007

(65) Prior Publication Data

US 2009/0165102 A1 Jun. 25, 2009

(51) Int. Cl.
*G06F 15/16* (2006.01)
*G06F 17/30* (2006.01)
*H04L 29/06* (2006.01)
*G06F 21/41* (2013.01)

(52) U.S. Cl.
CPC .......... *H04L 63/0815* (2013.01); *H04L 63/083* (2013.01); *G06F 21/41* (2013.01)
USPC ............................ 726/6; 726/1; 726/4; 726/5

(58) Field of Classification Search
CPC ... H04L 63/0815; H04L 63/083; G06F 21/41; G06Q 10/087; G06Q 10/06
USPC ........................................................ 726/1–6
See application file for complete search history.

(56) References Cited

U.S. PATENT DOCUMENTS

| | | | | |
|---|---|---|---|---|
| 5,944,824 A * | 8/1999 | He | ................................... | 726/6 |
| 5,991,399 A * | 11/1999 | Graunke et al. | ............... | 380/279 |
| 6,243,816 B1 * | 6/2001 | Fang et al. | ......................... | 726/5 |
| 6,332,192 B1 * | 12/2001 | Boroditsky et al. | ............ | 713/168 |
| 7,260,838 B2 * | 8/2007 | Bones et al. | ....................... | 726/8 |
| 7,266,695 B2 * | 9/2007 | Nakayama | ..................... | 713/172 |
| 7,526,654 B2 * | 4/2009 | Charbonneau | ................. | 713/188 |
| 7,721,328 B2 * | 5/2010 | Boulos et al. | ..................... | 726/6 |
| 7,793,343 B2 * | 9/2010 | Timmerman | ..................... | 726/8 |
| 7,890,643 B2 * | 2/2011 | Justus et al. | .................... | 709/229 |
| 2002/0112186 A1 * | 8/2002 | Ford et al. | ...................... | 713/201 |
| 2002/0194508 A1 * | 12/2002 | Sanchez et al. | ............... | 713/202 |
| 2003/0079147 A1 * | 4/2003 | Hsieh et al. | .................... | 713/201 |
| 2003/0126098 A1 * | 7/2003 | Hine et al. | ...................... | 705/400 |
| 2003/0177351 A1 * | 9/2003 | Skingle | .......................... | 713/156 |
| 2003/0188201 A1 * | 10/2003 | Venkataramappa | .......... | 713/202 |
| 2004/0049677 A1 * | 3/2004 | Lee et al. | ........................ | 713/166 |
| 2004/0199795 A1 * | 10/2004 | Grewal et al. | ................... | 713/202 |
| 2004/0250118 A1 * | 12/2004 | Andreev et al. | ................ | 713/201 |
| 2004/0260953 A1 * | 12/2004 | Jamieson et al. | .............. | 713/202 |
| 2005/0022006 A1 * | 1/2005 | Bass et al. | ...................... | 713/201 |
| 2005/0081066 A1 * | 4/2005 | Lahdensivu et al. | ........... | 713/202 |
| 2005/0210267 A1 * | 9/2005 | Sugano et al. | ................. | 713/186 |
| 2005/0233741 A1 * | 10/2005 | Zamani et al. | ............. | 455/432.3 |
| 2006/0031926 A1 * | 2/2006 | Shoham | ............................ | 726/8 |
| 2006/0112420 A1 * | 5/2006 | Challener et al. | ................. | 726/5 |
| 2007/0118733 A1 * | 5/2007 | Boogert et al. | ................. | 713/155 |
| 2007/0157298 A1 * | 7/2007 | Dingwall et al. | ................. | 726/8 |
| 2007/0169174 A1 * | 7/2007 | Critten et al. | ...................... | 726/3 |
| 2007/0208936 A1 * | 9/2007 | Ramos Robles | .............. | 713/168 |

(Continued)

*Primary Examiner* — Catherine Thiaw
(74) *Attorney, Agent, or Firm* — Kilpatrick Townsend & Stockton LLP (57) ABSTRACT

This disclosure describes, generally, methods and systems for password management. In one embodiment, a method may include receiving, at a centralized password repository, requests from users. Each request may be configured to request a password to allow access to an associated application. In one embodiment, at least two of the users are at different locations. The method may further include performing a validation analysis for the users' credentials, and in response to verification of a user's credentials, transmitting a response including the password configured to provide access to the associated application.

18 Claims, 5 Drawing Sheets

(56) References Cited

U.S. PATENT DOCUMENTS

| | | |
|---|---|---|
| 2008/0201446 A1* | 8/2008 | Svendsen .................... 709/218 |
| 2008/0276309 A1* | 11/2008 | Edelman ......................... 726/9 |
| 2009/0006852 A1* | 1/2009 | Qiu et al. ..................... 713/176 |
| 2009/0055823 A1* | 2/2009 | Zink et al. .................... 718/100 |
| 2009/0077638 A1* | 3/2009 | Norman et al. .................. 726/5 |
| 2010/0017616 A1* | 1/2010 | Nichols et al. ............... 713/183 |

* cited by examiner

ONLINE PASSWORD MANAGEMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to password management, and more particularly, to centralized and secure password management.

BACKGROUND

Currently, more and more environments require password authentication in order to access environment resources. As a result, tracking and managing this abundant number of passwords in an efficient and secure manner has become increasingly difficult. Presently, passwords are managed in an "ad-hoc" de-centralized manner. For example, passwords are managed using ascii documents (or other text files) located on a server (e.g., UNIX, Windows™, etc.), and access to the document is protected by file level permissions.

Such a method of storing passwords can be difficult to manage and keep secure. Since many environments span across a number of computer systems over a number of networks, knowing exactly where a certain password is located, for what system the password applies, what level of permissions are associated with the password, etc., can be extremely difficult if not impossible. In addition, when passwords are accessed and transmitted across networks, the security of such passwords may be compromised. Furthermore, as system environments grow and increase their number of associated users, the problem is compounded. Hence, there is a need for improved methods and systems in the art.

BRIEF SUMMARY

Embodiments of the present invention are directed to a method of centralized password management. In one embodiment, the method may include receiving, at a centralized password repository, requests from users. Each request may be configured to request a password to allow access to an associated application. In one embodiment, at least two of the users are at different locations. The method may further include performing a validation analysis for the users' credentials, and in response to verification of a user's credentials, transmitting a response including the password configured to provide access to the associated application.

According to further embodiments, a system for managing passwords is described. In one embodiment, the system may include a client system. The client system may include a command line interface which may be configured to receive input from a user. Based on the input, a request for a password associated with an application may be generated.

The system may further include a password management system. The password management system may be coupled with the client system and may include a centralized password repository. The password management system may be configured to receive the password request from the user and to perform a validation analysis of the user's credentials. Upon validation of the user's credentials, the password management system may access the centralized password repository and retrieve the requested password. Then, the password management system may transmit a response to the client system which includes the requested password.

In an alternative embodiment, a machine-readable medium is described. The machine-readable medium may have sets of instructions stored thereon which, when executed by a machine, may cause the machine to perform various functions. In one embodiment, the functions may include receiving, at a centralized password repository, requests from users. Each request may be configured to request a password to allow access to an associated application. In one embodiment, at least two of the users are at different locations. The functions may further include performing a validation analysis for the users' credentials, and in response to verification of a user's credentials, transmitting a response including the password configured to provide access to the associated application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention involve an on-line, centralized and secure password management system. In one embodiment, the system may provide a central repository of passwords that may be accessed by users in order to provide access to various applications and/or environment resources. In a further embodiment, because the system is "on-line" users may be able to access the password repository from anywhere they are able to obtain Internet or network access.

According to further aspects of the present invention, all communications between the management system and users, as well as internal communications within the management system, may be secure. Such security can ensure that no fraudulent users are inappropriately granted access to passwords and applications. Furthermore, because of the centralized nature of the management system, updating passwords can be accomplished by a single update. In other words, instead of updating each instance of a user's password stored on many different servers, the management system can simply perform an update of one password at a central repository.

Figure 1:
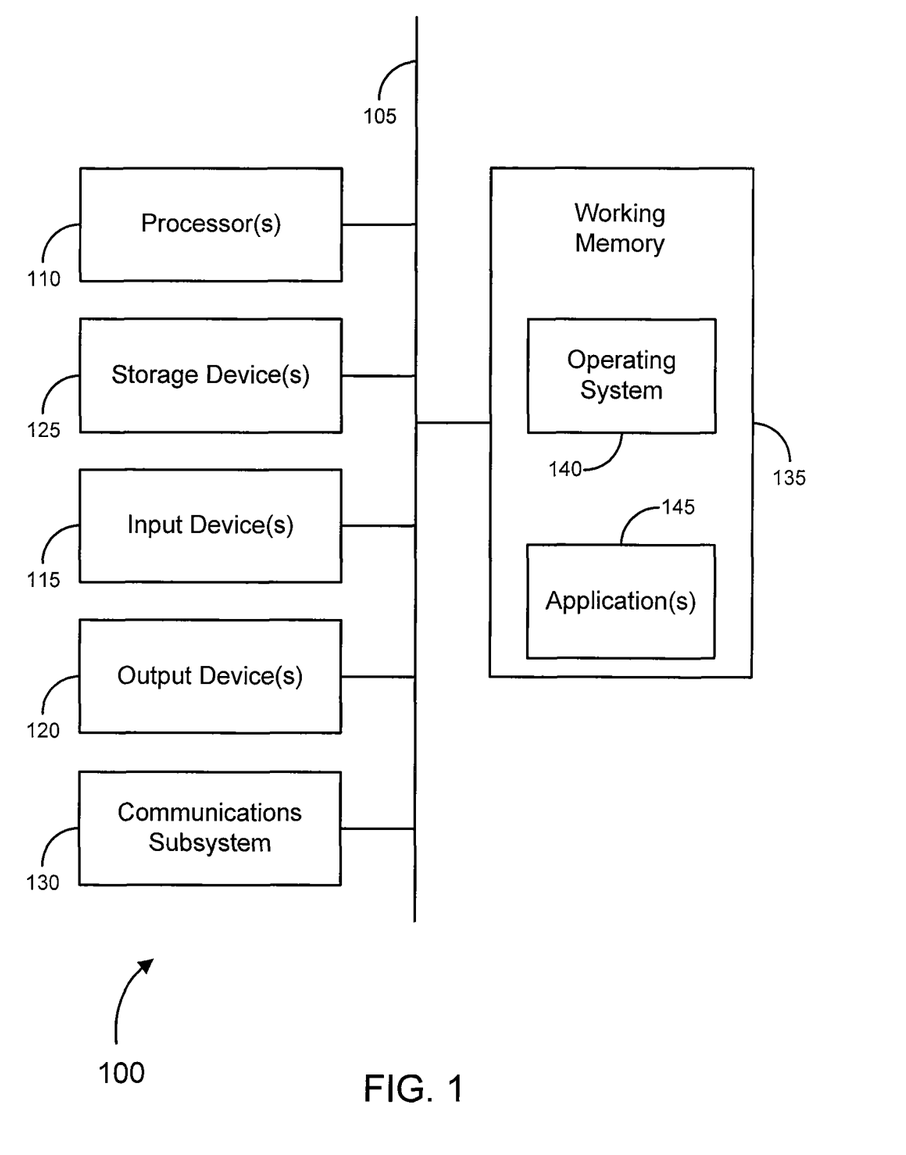
FIG. 1 is a generalized schematic diagram illustrating a computer system, in accordance with various embodiments of the invention.

FIG. 1 provides a schematic illustration of one embodiment of a computer system 100 that can perform the methods of the invention, as described herein, and/or can function as, for example, as any part of the on-line password management system according to aspects of the present invention. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation one or more general-purpose processors and/or one or more special-purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation dynamic memory, such as the working memory 135. Transmission media includes coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
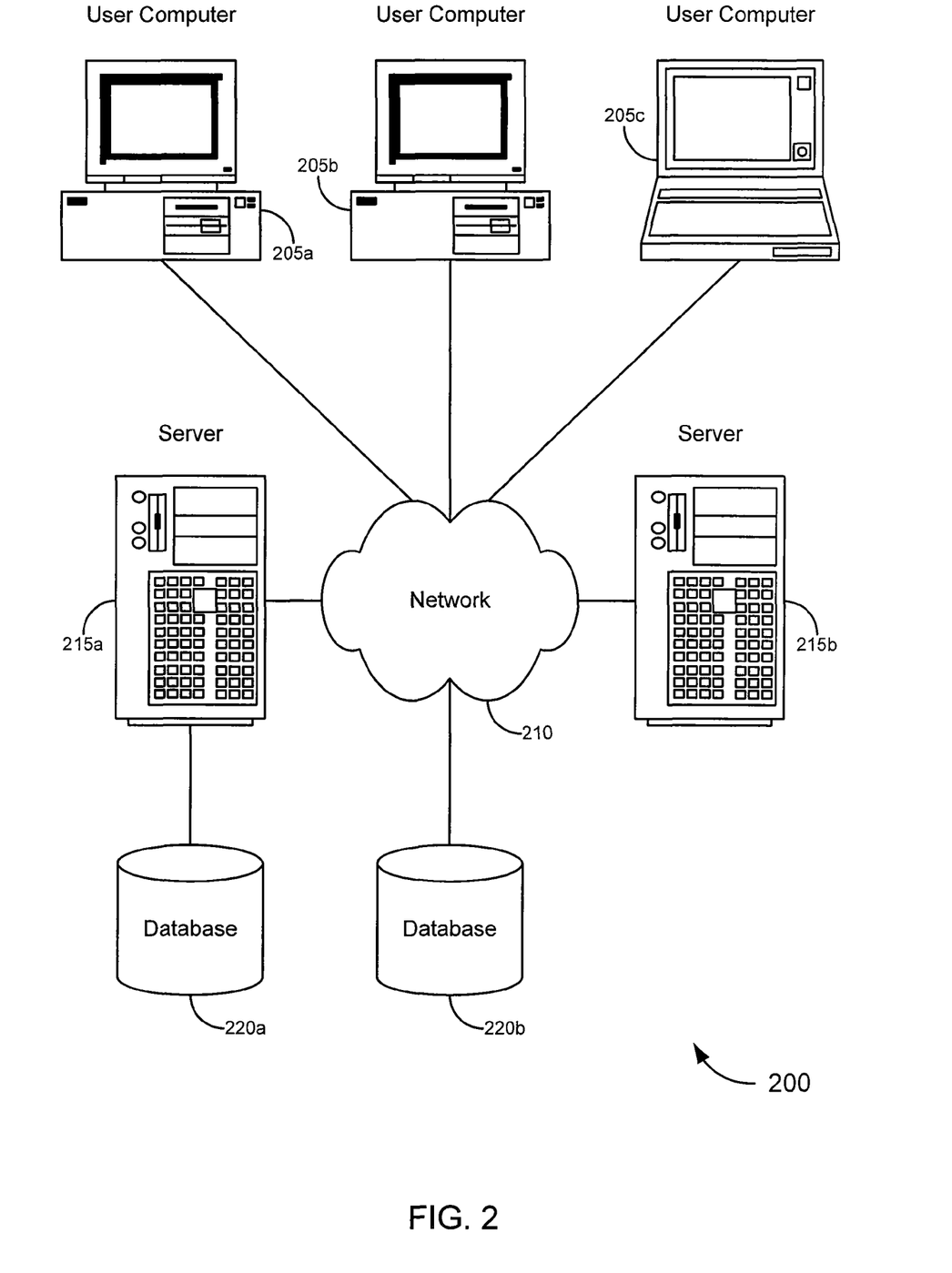
FIG. 2 is a block diagram illustrating a networked system of computers, which can be used in accordance with various embodiments of the invention.

A set of embodiments comprises systems for managing passwords in a centralized, secure, and on-line environment. In one embodiment, user computers 205 and/or servers 215 may be implemented as computer system 100 in FIG. 1. Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially-available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention, such as a webpage of the password management system. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 220 is discretionary: merely by way of example, a database 520*a* might reside on a storage medium local to (and/or resident in) a server 215*a* (and/or a user computer 205). Alternatively, a database 220*b* can be remote from any or all of the computers 205, 215, so long as it can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
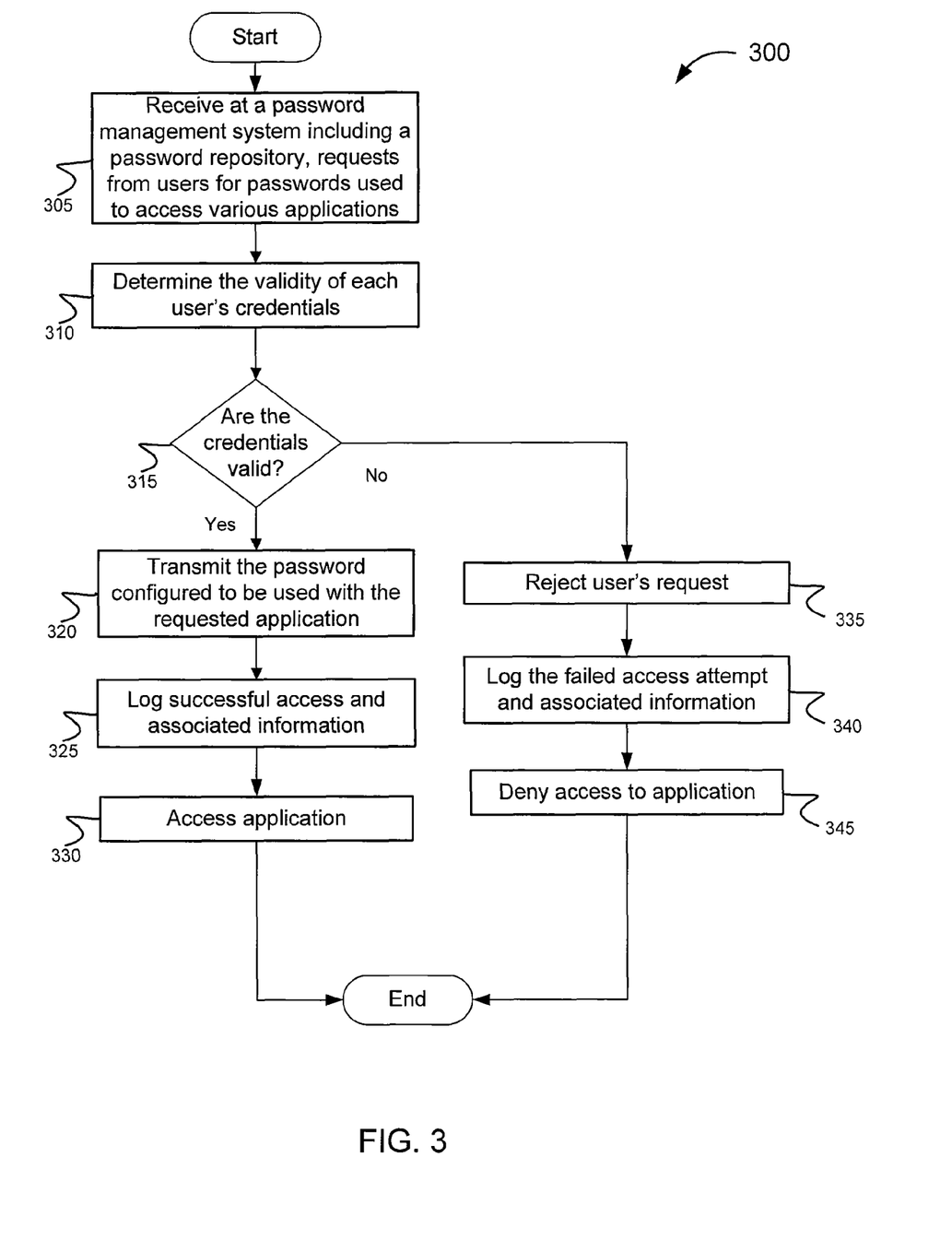
FIG. 3 is a process flow diagram illustrating a method of password management, in accordance with various embodiments of the invention.
Figure 4:
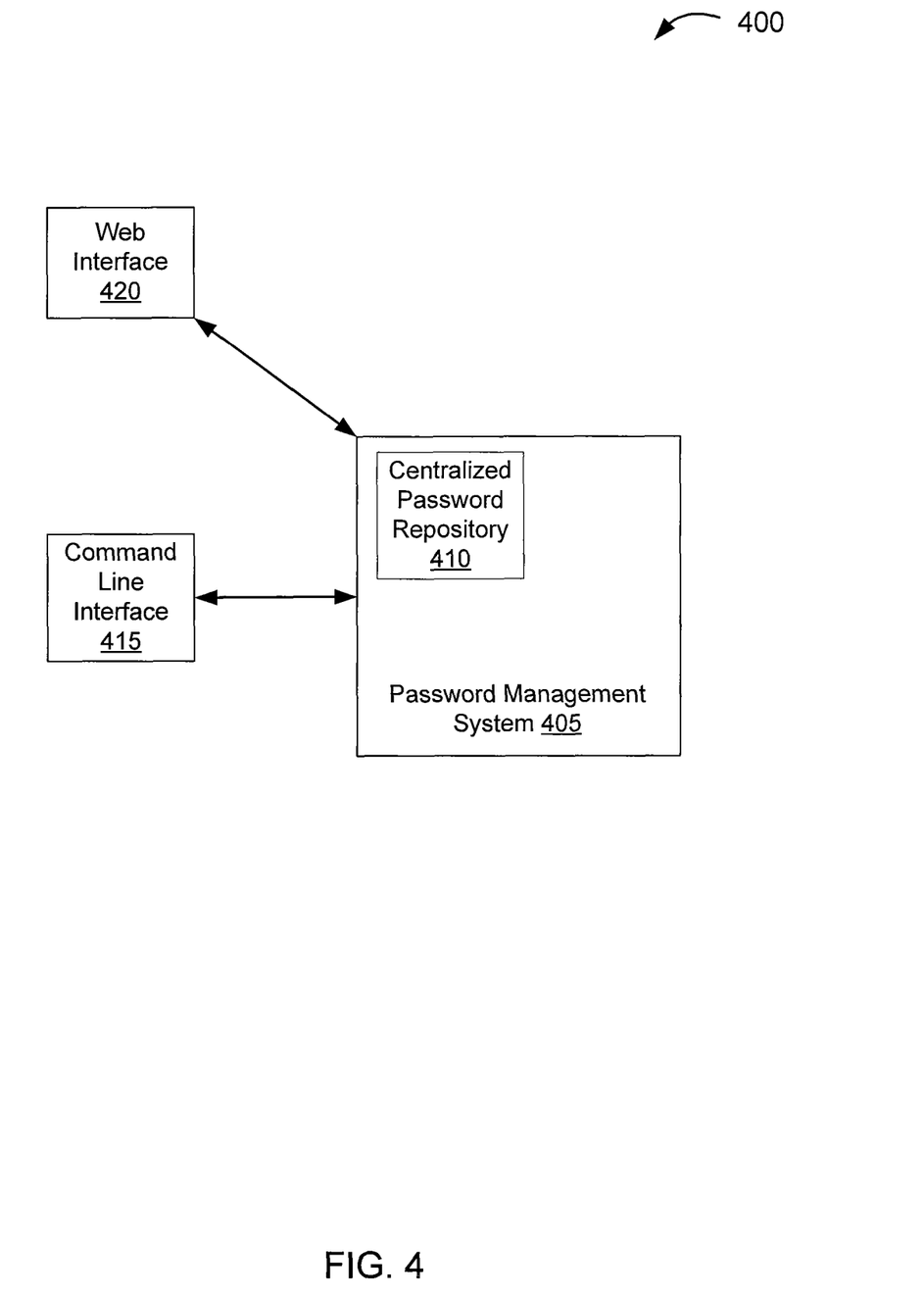
FIG. 4 is a block diagram illustrating a password management system, in accordance with various embodiments of the invention.

In one embodiment, databases 220 may be implemented as a centralized password repository 410 in FIG. 4. Furthermore, servers 215 may be implemented as a password management system 405 in FIG. 4. Turning now to FIG. 3, which illustrates a method 300 of managing passwords according to one embodiment of the present invention. At process block 305, requests to a password management system are received from users requesting passwords used to access various applications. In one embodiment, the password management system may include a centralized password repository. Such a repository may contain all of the passwords associated with every application within a given environment for each user within that environment. In a further embodiment, the repository may be stored in a single database or alternatively may be stored in multiple databases. The database may be encrypted using various encryption techniques such as, obfuscation, DES encryption, triple DEC encryption (3DES), advanced encryption standard (AES), cipher-block chaining (CBC), etc.

At process block 310, a user's credentials may be checked to determine whether the user is a valid user. In one embodiment, the credentials checked may be the user's userID, the media access control (MAC) or Internet protocol (IP) address of the system the user is requesting from, the access level of the requesting user, etc. For example, a user, based on their userID may have permission to access a given application only when the attempt to gain access originates from a certain system or systems. Otherwise, the attempted access will be denied and the password will not be transmitted to the user. Thus, by checking a requesting system's IP address or MAC address, the password management system can determine if the request is originating from an authorized system.

In a further embodiment, the userID may be valid, but may not be configured for accessing the requested application. Ultimately, the password management system is to determine if the user's credentials are valid (decision block 315). In response to the user's credentials being valid (i.e., the userID, the requesting system, and the requested application all are a valid combination), the requested password may then be transmitted to the user (process block 320). In one embodiment, the transmitted password may be encrypted before being transmitted in order to ensure the security and authenticity of the password during transit to the user.

At process block 325, the successful password access may be logged in a log file associated with the password management system. The log entry may indicate the userID, the accessing system, the application being accessed, the date and time of the successful access, etc. In one embodiment, the log may be used to track usage of the management system, the frequency of use of certain applications, and other statistical information that can be used to better perform password management. Once the user has successfully obtained the requested password the user can proceed to access the associated application (process block 330).

In an alternative embodiment, if the users credentials are found to be invalid, the user's password request may be rejected (process block 335). The rejection may be displayed to the user, and then the user may be given an additional opportunity or opportunities to request the password again. In one embodiment, upon a failed attempt or failed attempts, the user may be locked out of the password management system.

At process block 340, the failed attempt to access a password may be stored in a log file of failed attempts. The log of failed attempts may be used to detect fraudulent accesses and/or intrusion attempts. Furthermore, the log file may be used to track fraudulent systems and ban would be "hackers." Consequently, in response to the failed attempt to access the password, the user is denied access to the requested application (process block 345).

Referring to FIG. 4, which illustrates a system 400 according to embodiments of the present invention. In one embodiment, system 400 may include a password management system 405 which may include a centralized password repository 410. Password management system 405 may be configured to manage, in a centralized manner, all of the passwords within an application environment by accessing centralized password repository 410. System 400 may further include a command line interface 415 and a web interface 420 connected with password management system 405.

In one embodiment, a user may use command line interface 415 (e.g., a UNIX command line) to access password management system 405 in order to retrieve a password to be used to access an application. Using command line interface 415, the user may transmit their request to password management system 405. However, the presence of password management system 405 may be transparent to the user. For example, the user may use the "get_pwd( )" command associated with UNIX, but instead of the command accessing a local password file the command may transmit a request to password management system 405. Thus, the user is unaware that the password they are trying to retrieve is located remotely at password management system 405 instead of locally at their system in a text file.

In a further embodiment, the password request may be encrypted before being transmitted between command line interface 415 and password management system 405. Thus, hacking and/or sniffing attempts can be mitigated for requests in transit. Upon receipt of a request, password management system 405 may determine if the requesting user's credentials are valid (see FIG. 3 above). If it is determined that the user's credentials are valid, then password management system 405 may retrieve the requested password from centralized password repository 410. In one embodiment, the password retrieval message may be encrypted prior to transmitting the request to centralized password repository 410.

Additionally, the passwords may be stored in centralized password repository 410 in an encrypted form. Thus, password management system 405 is able to maintain two levels of security with stored and retrieved passwords. In one embodiment, the retrieved password is transmitted to the requesting user at command line interface 415. The transmission between command line interface 415 and password management system 405 may also be encrypted. Thus, system 400 may be configured to implement end-to-end encryption during the password retrieval process.

In a further embodiment, system 400 may include a web interface 420. Web interface 420 may be configured to give administrators access to password management system 405 via an Internet or other network connection through, for example, the administrator's web browser. Access to web interface 420 may be restricted using a login and password. In one embodiment, all communications between web interface 420 and password management system 405 may be secured using encryption (e.g., secure socket layer (SSL) encryption). The administrator may use web interface 420 to change permission levels of users, change password policies, change users' passwords, etc.

In one embodiment, since password management system 405 includes a centralized password repository 410, any change to a password need only be made in a single location (i.e., centralized password repository 410). Thus, even though, for example, a user may have access to multiple applications on multiple servers within a system environment, when a password is changed, it need only be changed in centralized password repository 410. Accordingly, the changing/updating of passwords is significantly streamlined.

In addition to changing passwords, an administrator may need to generate passwords to assign to new and/or existing users. For example, many application environments may have policies in place which indicate that passwords should be changed after a certain amount of time (e.g., 30 days, 60 days, 90 days, etc.). In addition, an application environment may require that the passwords be a certain length and include a certain combination of alpha-numeric characters. Such passwords and frequent generation of passwords can be difficult to generate and manage manually. Accordingly, password management system 405 may be configured to generate passwords dynamically. Upon generation, the passwords can then be stored in centralized password repository 410 for later use by the associated users.

In a further embodiment, web interface 420 may provide an administrator with access to log files generated by password management system 405. An administrator may be able to analyze the log files in order to track intrusions and other fraudulent attempts made against password management system 405. The administrator may also detect abuse perpetrated by valid users. In one embodiment, the log files may provide an administrator with an audit trail of password retrieval and/or denial.

Figure 5:
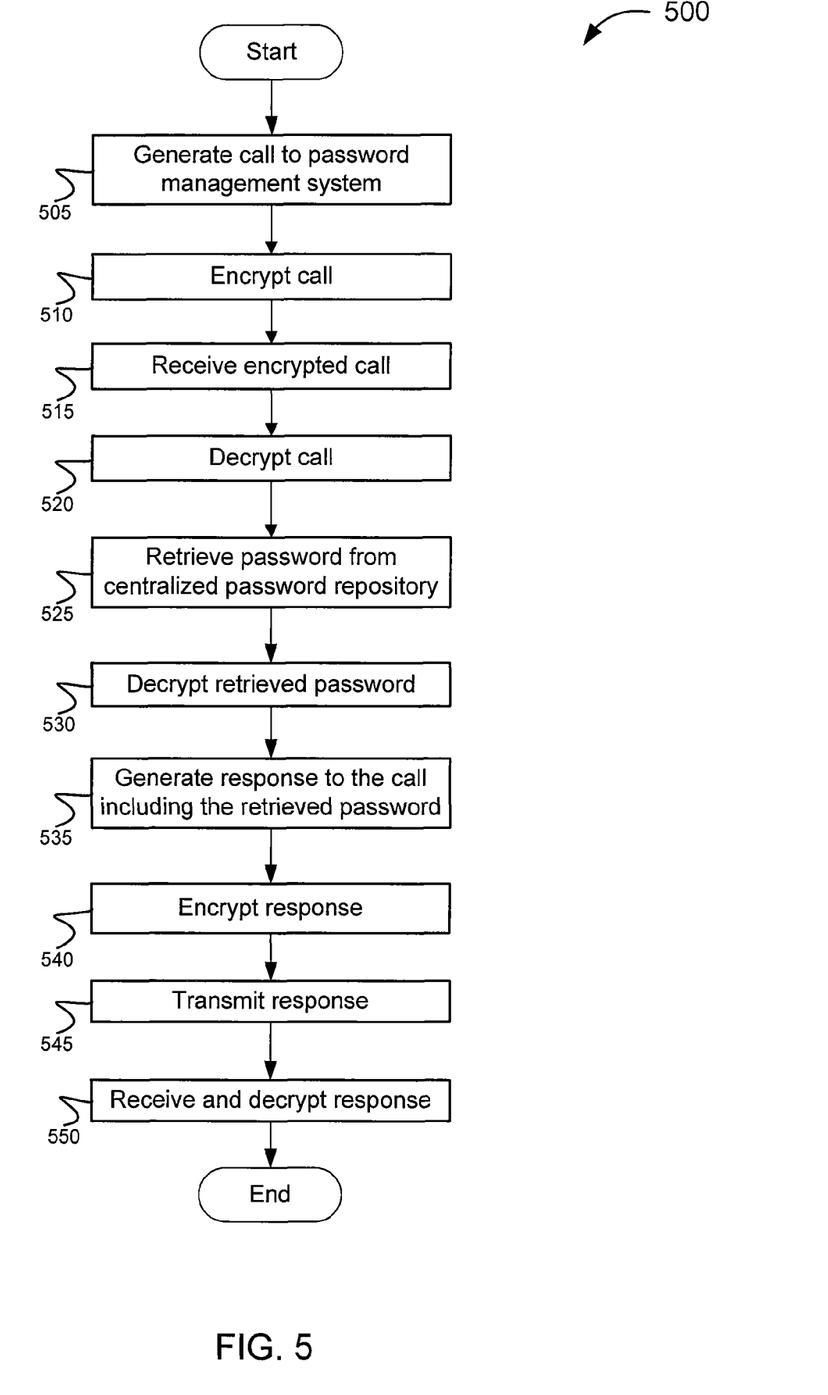
FIG. 5 is a flow diagram illustrating communications involved in accessing a password management system, in accordance with various embodiments of the invention.

Turning now to FIG. 5, which illustrates a method 500 according to aspects of the present invention. At process block 505, a call to the password management system (e.g., password management system 405) may be generated. In one embodiment, the call may be a request for a password in order to be granted access to a certain application. At process block 510, the call may be encrypted in order to securely deliver the call to the password management system.

At process block 515, the encrypted call may be received by the password management system. Upon receipt of the call, the password management system may decrypt the call (process block 520). In one embodiment, the decrypted call may be analyzed to determine the validity of the call. At process block 525, the requested password associated with the call may be retrieved. In one embodiment, the retrieved password may be in an encrypted form. The password management system may then decrypt the retrieved password (process block 530).

At process block 535, a response to the call may be generated which may include the retrieved password. The response may then be encrypted (process block 540) and transmitted to the requesting user (process block 545). At process block 550, the response may be retrieved and decrypted by the user. Furthermore, the user may then access the associated application.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of centralized password management, the method comprising:
  storing, in a single database of a centralized password repository of a password management system, a plurality of passwords associated with a plurality of applications for each of a plurality of users, wherein the centralized password repository stores all passwords for each of the plurality of users and each of the plurality of applications in the single database, and wherein the plurality of applications are running on a plurality of servers;
  receiving, at the centralized password repository of the password management system, a request from a user of the plurality of users for a password to allow access to an associated application;

performing, by the password management system, a validation analysis for the user, the validation analysis comprising validation based at least in part on a combination of credentials for, the user, the combination of credentials including a user identification, an application request, and a media access control (MAC) address of a computer system originating the request, wherein the performing the validation analysis further comprises verifying that the media access control (MAC) address of the computer system originating the request corresponds to an authorized system;

in response to verification of the combination of credentials for the user, transmitting, from the password management system, a response including the password configured to provide access to the associated application;

receiving a password change request from one user of the plurality of users, wherein the password change request comprises a change to at least one password which provides access to the plurality of applications on the plurality of servers for the one user of the plurality of users; and changing the at least one password in a single instance stored in the centralized repository, wherein changing of the single instance of the at least one password applies to each of the plurality of applications on the plurality of servers for which the at least one password is used to provide the one user of the plurality of users access to the plurality of applications on the plurality of servers within a system environment, wherein the at least one password need only be changed in the centralized password repository and access to each of the plurality of servers is maintained.

2. The method of claim 1, wherein the request for the password and the response are encrypted.

3. The method of claim 1, further comprising updating at least one password stored in the centralized password repository.

4. The method of claim 3, wherein the updating of the at least one password comprises loading a new password into the centralized password repository to replace an existing password.

5. The method of claim 1, wherein the passwords stored in the centralized password repository are encrypted.

6. The method of claim 1, further comprising dynamically generating passwords to be stored in the centralized password repository.

7. The method of claim 1, further comprising:
receiving a second password request from a second user of the plurality of users, and performing a second validation analysis based at least in part on a second combination of credentials for the second user;
in response to the second combination of credentials failing the second validation analysis, denying the second password request.

8. The method of claim 7, further comprising storing the denying of the second password request and information associated with the second user in a log file.

9. The method of claim 8, wherein the information associated with the second user includes at least one of a requesting system, an Internet protocol (IP) address of the requesting system, and an application associated with the second password request.

10. The method of claim 1, further comprising accessing the centralized password repository from at least one of a command line interface, a web interface, and a computer system.

11. The method of claim 1, further comprising identifying a second computer system that the password change request is generated from.

12. The method of claim 11, wherein the second computer system is identified based at least in part on the a media access control (MAC) address of the second computer system and/or an Internet protocol (IP) address of the second computer system.

13. A system for managing passwords, the system comprising:
a client system including a command line interface, wherein the command line interface is configured to receive input from a user which generates a request for a password associated with an application; and
a password management system including a centralized password repository which includes a single database and coupled with the client system, wherein the password management system is configured to:
store, in the single database of the centralized password repository, a plurality of passwords associated with a plurality of applications for each of a plurality of users, wherein the centralized password repository stores all passwords for each of the plurality of users and each of the plurality of applications in the single database, and wherein the plurality of applications are running on a plurality of servers;
receive the request for the password generated in response to input from the user;
perform a validation analysis of a combination of credentials for the user, the combination of credentials including a user identification, an application request, and a media access control (MAC) address of a computer system originating the request, wherein the performing the validation analysis further comprises verifying that the media access control (MAC) address of the computer system originating the request corresponds to an authorized system;
upon validation of the combination of credentials for the user, access the centralized password repository and retrieve the requested password;
transmit a response to the client system including the password;
receive a password change request from one user of the plurality of users, wherein the password change request comprises a change to at least one password which provides access to the plurality of applications on the plurality of servers for the at least one of the plurality of users;
change the at least one password in a single instance stored in the centralized repository, wherein changing of the single instance of the at least one password applies to each of the plurality of applications on the plurality of server for which the at least one password is used to provide the one of the plurality of users access to the plurality of applications on the plurality of servers within a system environment, wherein the at least one password need only be changed in the centralized password repository and access to each of the plurality of servers is maintained.

14. The system of claim 13, further comprising a web interface coupled with the password management system configured to allow an administrator to manage the password management system.

15. The system of claim 14, wherein the management of the password management system comprises at least one of changing passwords stored in the centralized password repository, updating password policies, and accessing log files.

16. The system of claim 13, wherein at least one of the request for the password, the response, and/or the requested password is encrypted.

17. The system of claim 13, further comprising a plurality of client systems coupled to the password management system, wherein at least two of the plurality of client systems are at different locations.

18. A non-transitory machine-readable medium for password management having sets of instructions stored thereon which, when executed by a machine, cause the machine to:
   store, in a single database of a centralized password repository of a password management system, a plurality of passwords associated with a plurality of applications for each of a plurality of users, wherein the centralized password repository stores all passwords for each of the plurality of users and each of the plurality of applications in the single database, and wherein the plurality of applications are running on a plurality of servers;
   receive, at the centralized password repository of the password management system, a request from a user of a plurality of users for a password to allow access to an associated application;
   perform, by the password management system, a validation analysis for the user, the validation analysis comprising validation based at least in part on a combination of credentials for the user, the combination of credentials including a user identification an application request, and a media access control (MAC) address of a computer system originating the request, wherein the performing the validation analysis further comprises verifying that the media access control (MAC) address of the computer system originating the request corresponds to an authorized system;
   in response to verification of the combination of credentials for the user, transmit, from the password management system, a response including the password configured to provide access to the associated application;
   receive a password change request from one user of the plurality of users, wherein the password change request comprises a change to at least one password which provides access to the plurality of applications on the plurality of servers for the one of the plurality of users; and
   change the at least one password in a single instance stored in the centralized repository, wherein changing of the single instance of the at least one password applies to each of the plurality of applications on the plurality of servers for which the at least one password is used to provide the one user of the plurality of users access to the plurality of applications on the plurality of servers within a system environment, wherein the at least one password need only be changed in the centralized password repository and access to each of the plurality of servers is maintained.

* * * * *

UNITED STATES PATENT AND TRADEMARK OFFICE
CERTIFICATE OF CORRECTION

PATENT NO. : 8,813,200 B2  
APPLICATION NO. : 11/963405  
DATED : August 19, 2014  
INVENTOR(S) : Zagni Page 1 of 1

It is certified that error appears in the above-identified patent and that said Letters Patent is hereby corrected as shown below:

In the specification

In column 4, line 15, delete "and or" and insert -- and/or --, therefor.

In the claims

In column 11, line 4, in Claim 1, delete "for," and insert -- for --, therefor.

In column 12, line 5, in Claim 12, delete "the a" and insert -- a --, therefor.

In column 14, line 1, in Claim 18, delete "identification" and insert -- identification, --, therefor.

Signed and Sealed this  
Third Day of March, 2015

Michelle K. Lee  
*Deputy Director of the United States Patent and Trademark Office*